April 22, 1969   K. E. A. GOTHBERG   3,439,777
OIL MIST LUBRICATOR
Filed Sept. 6, 1966
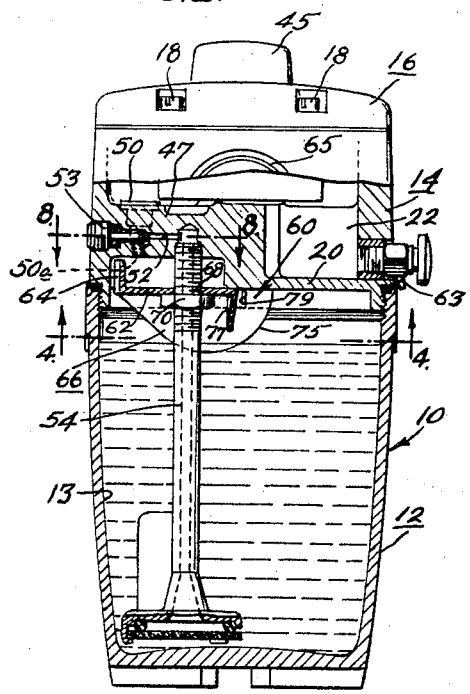
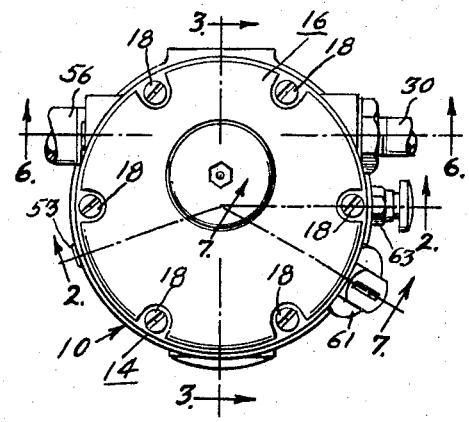
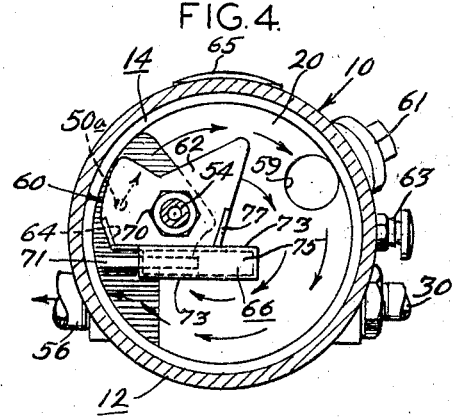
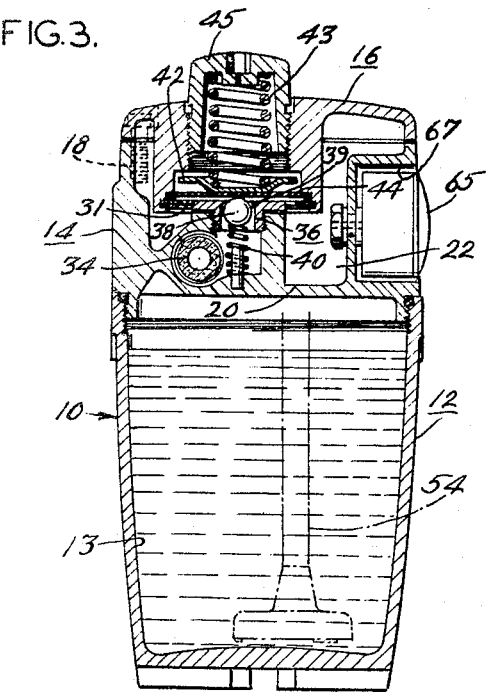
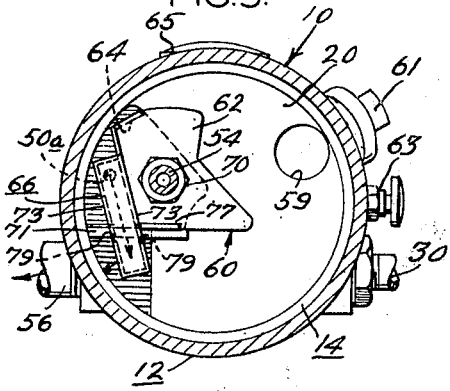
INVENTOR:
BY KARL EVALD ANDREAS GÖTHBERG
*Howson & Howson*
ATTYS.

April 22, 1969  K. E. A. GOTHBERG  3,439,777
OIL MIST LUBRICATOR
Filed Sept. 6, 1966  Sheet 2 of 2
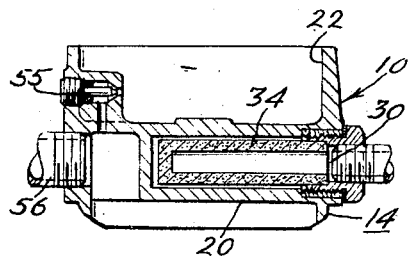
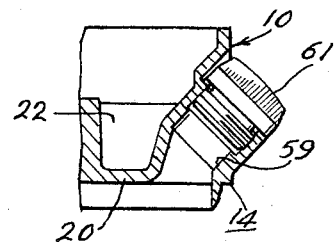
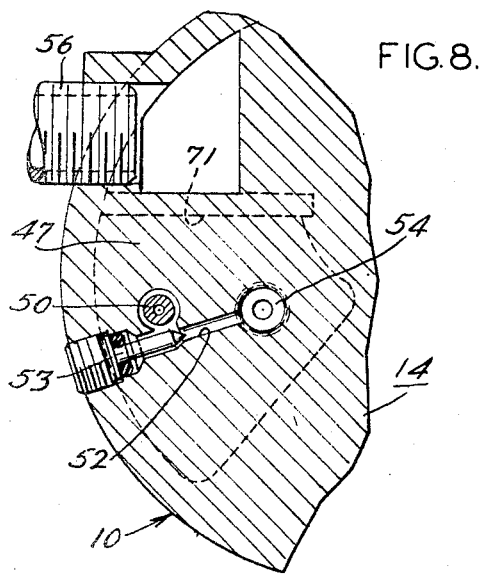
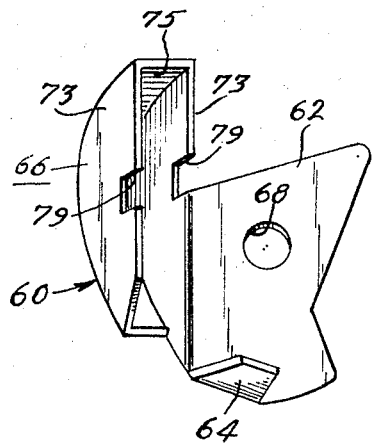
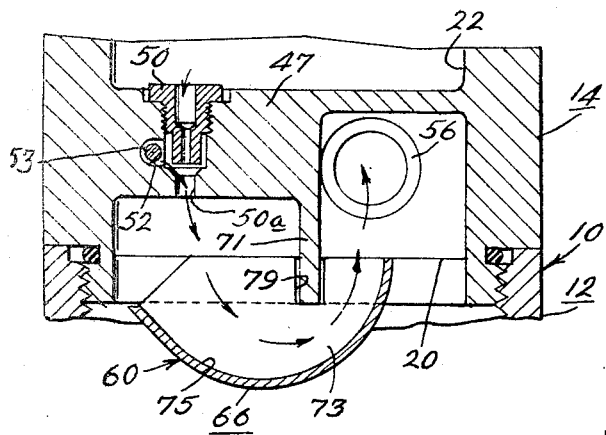
INVENTOR:
KARL EVALD ANDREAS GÖTHBERG
BY Howson & Howson
ATTYS.

United States Patent Office 3,439,777
Patented Apr. 22, 1969

3,439,777
OIL MIST LUBRICATOR
Karl Evald Andreas Gothberg, Backasen, Lerum, Sweden, assignor to Aktiebolaget Svenska Kullagerfabriken, Goteborg, Sweden, a corporation of Sweden
Filed Sept. 6, 1966, Ser. No. 577,356
Int. Cl. F01m *1/08;* A61m *11/02;* B05b *7/32*
U.S. Cl. 184—55                                8 Claims

ABSTRACT OF THE DISCLOSURE

A lubricator comprising a container defining a reservoir for a lubricant, a chamber for a gaseous fluid above the lubricant reservoir including a dividing wall between the chamber and lubricant reservoir, an ejector nozzle in the dividing wall, means operatively connecting the ejector nozzle with the lubricant reservoir whereby a jet of lubricant mist is discharged from the ejector nozzle, a discharge outlet for the lubricant mist and a guide member interposed in the path of the jet of lubricant mist which is selectively adjustable to vary the concentration of lubricant in the lubricant mist delivered at the discharge outlet.

---

The present invention relates to an oil mist lubricator and more particularly to a lubricator incorporating means whereby the concentration of the oil in the mist may be selectively varied.

The oil mist lubricator comprises a container of generally cup-like form defining an oil reservoir and an enclosed housing mounted over the container having a dividing wall or diaphragm separating the oil reservoir and an air chamber, suitable means being provided to pressurize the air chamber. An air discharge nozzle is provided in the dividing wall of the housing which intersects a passageway communicating with a riser tube in the oil reservoir whereby oil is drawn from the oil reservoir and discharged from the discharge nozzle as a jet of oil mist which is directed through a discharge outlet in the housing. In accordance with the present invention, means is provided for selectively varying the concentration of the oil in the oil mist discharged from the lubricator. More specifically, the oil concentration control means comprises a guide member or diverter consisting of a baffle or deflector plate and an arcuate channel member at one side of the baffle. The guide member is mounted adjacent the discharge side of the nozzle and is adapted to be disposed between a first position wherein the baffle plate is disposed in the path of flow from the discharge nozzle and a second position wherein the arcuate channel is in registry with the discharge nozzle. In the first position wherein the baffle confronts the nozzle discharge, a very pure and oil saving mist is obtained at the discharge port by reason of the fact that the oil jet from the discharge nozzle impinges against the baffle and is diverted into a horizontal arcuate path through the space above the oil in the oil reservoir to the discharge outlet. During flow of the oil mist in the arcuate path, oil droplets formed with the oil mist collect on the baffle and drop into the oil reservoir and any droplets remaining are separated from the jet as it traverses this arcuate path. In the second limit position, the diverter channel directly connects the discharge side of the nozzle with the discharge outlet to provide for maximum oil concentration in the oil mist discharged from the lubricator.

An object of the present invention is to provide an oil mist lubricator of the ejector type including a guide member which is selectively adjustable to vary the concentration of oil in the oil mist discharged from the lubricator.

Another object of the present invention is to provide an oil mist lubricator of the ejector type incorporating a guide or diverter member interposed in the path of flow of the jet of oil mist from the ejector nozzle to the discharge outlet in the lubricator which is selectively adjustable between a first position wherein the oil jet from the discharge or ejector nozzle is diverted in an arcuate path to provide a very pure and oil saving mist, and a second limit position wherein the jet discharge from the ejector nozzle flows directly to the discharge outlet to obtain maximum oil concentration.

A further object of the present invention is to provide an oil mist lubricator of the ejector type which is relatively simple and economical to make and which is fully effective for the purposes intended.

These and other objects of the present invention and the various features and details of the operation and construction thereof are hereinafter more fully set forth with reference to the accompanying drawings, wherein:

FIG. 1 is a plan view of the oil mist lubricator in accordance with the present invention;

FIGS. 2 and 3 are sectional views taken on lines 2—2 and 3—3 of FIG. 1;

FIG. 4 is a sectional view taken on lines 4—4 of FIG. 2 with the deflector plate of the guide member or diverter disposed in a position overlying the oil-air mixing nozzle;

FIG. 5 is a view similar to FIG. 4 with the diverter turned to a position wherein the arcuate channel of the guide member is aligned with the oil discharge nozzle for maximum concentration of oil in the mist at the discharge port;

FIGS. 6 and 7 are sectional views taken on line 6—6 and 7—7 of FIG. 1;

FIG. 8 is an enlarged sectional view taken on line 8—8 of FIG. 2;

FIG. 9 is a sectional view through the oil mist lubricator showing the position of the diverter illustrated in FIG. 5 for maximum oil concentration; and FIG. 10 is a perspective view of the guide or diverter member.

Referring now to the drawings and particularly to FIGS. 1–3 thereof, the oil mist lubricator, which is generally designated by the numeral 10, comprises a container 12 of cup-like form for holding a quantity of oil, a housing 14 mounted over the open end of the container 12 and a cover member 16 secured over the upper end of the housing by suitable screw fasteners 18, the housing 14 and container 12 having cooperating screw threads so that they may be assembled in the manner indicated in FIGS. 2 and 3. The housing 14 has at its lower end a dividing wall or diaphragm 20 thereby defining an air chamber 22 in the area above the oil reservoir 13.

The air chamber 22 is pressurized by suitable means including, in the present instance, an air inlet port 30 with an air filter 34 adapted to be connected by means, for example, of a conduit to a suitable air supply. As best illustrated in FIG. 3, air inlet port 30 communicates at its inner end with the air chamber 22 through a reduction valve 36. This reduction valve is a ball type wherein the ball 38 is biased upwardly to a closed position against the valve seat 39 by means of a spring 40. The ball 38 is adapted to be displaced downwardly to admit air from the port 30 to the air chamber 22 through an annular opening 41 surrounding the valve seat 39 by means of a spring actuator 43 seated on a washer 42 which in turn urges a diaphragm 44 made of a resilient material such as rubber against the ball 38. The bias of the spring actuator 43 may be varied by means of a regulating screw member 45 threaded in the cover as shown in FIG. 3. By this arrangement the air pressure in the air chamber 22 may be controlled.

Pressurized air from the air chamber 22 is directed through an axially disposed nozzle 50 and a discharge port 50a in an offset wall portion 47 of the dividing wall 20 of the housing, the nozzle discharge intersection a radial passageway 52 which communicates with the upper open end of a riser tube 54 having a filter at its lower end whereby oil is drawn through the riser tube from the oil reservoir and discharged as an oil mist through a discharge outlet 56 in the housing. A regulating screw or needle valve 53 is mounted in the side wall of the housing in the passageway 52 which is selectively adjustable to control flow of oil from the reservoir to the discharge nozzle 50. A similar regulating screw or needle flow control valve 55 is mounted in the housing adjacent the discharge outlet 56 whereby air from the air chamber 22 may be mixed with the oil mist at the discharge outlet.

By this arrangement the oil mist thus formed as it discharges from the discharge outlet 56 contains oil in the form of droplets and under normal circumstances may amount to as much as 90% of the oil quantity delivered by the lubricator.

As illustrated in FIG. 7, the housing 14 has a fill port 59 for filling the oil reservoir and a plug 61 normally closing the fill port 59. A drain cock 63 is also provided in the housing 14 to vent the air chamber. Further as illustrated in FIG. 3, an air gauge 65 is mounted in a recess 67 in the housing in communication with the air chamber 22 whereby the air pressure in the air chamber may be checked visually.

In accordance with the present invention, means is provided for controlling and selectively regulating the concentration of oil in the oil mist discharged from the lubricator. To this end in accordance with the present invention, there is provided a guide member or diverter generally designated by the numeral 60 mounted in the path of flow of the oil mist from the nozzle 50. In the present instance the guide member 60 consists of a generally triangularly shaped baffle plate section 62 having an upstanding ear 64 at one corner and a diverter channel member 66 integrally connected to the baffle 62 and generally in the form of a trough comprising semicircular spaced apart side walls 73 and a curved or arcuate connecting wall 75 forming the base of the trough. The guide member further includes a triangularly shaped rib 77 depending from the side edge of the baffle adjacent the cutouts 79 in the side walls of the channel member. As best illustrated in FIG. 2, the guide member or diverter is mounted on the riser tube, the upper end of the riser tube extending through an opening 68 in the baffle 62 and being held in a predetermined position on the riser tube by means of a nut 70.

Considering now the operation of the oil mist lubricator, assume that it is desired to obtain or discharge a very pure and oil saving mist. In this case the guide member 60 is mounted in the position shown in FIGS. 2 and 4. As illustrated therein, the baffle 62 directly underlies and confronts the discharge nozzle 50 and the open side of the channel 66 straddles a rib 71 depending from an offset wall portion 47 between the discharge end of nozzle 50 and discharge outlet 56 as shown in FIG. 9. Thus, the oil jet discharging from the nozzle 50 impinges against the upper face of the baffle 62, the jet being diverted into a horizontal arcuate path as indicated by the arrows in FIG. 4 through the space above the level of the oil in the oil reservoir, eventually discharging as indicated through the oil mist discharge outlet 56. It is noted that in this position of the guide member the upstanding ear 64 and depending rib 71 form somewhat of a barrier to direct the flow from the discharge nozzle 50 in the direction indicated above.

During flow of the oil mist in the direction indicated, oil droplets formed with the oil mist collect on the baffle from which they drop into the oil bath. Any droplets remaining are separated from the jet as it traverses its arcuate path. Now when it is desired to obtain the greatest possible concentration in the oil mist, the guide member or diverter 60 is rotated to the position shown in FIG. 5 wherein the discharge end of the nozzle 50 is aligned with the open end of the channel member 66 and the opposite end of the channel member communicates directly with the oil mist discharge outlet 56 as illustrated in FIG. 9. In this manner the oil mist jet flows directly through the channel member from the discharge end of the nozzle 50 to the oil mist discharge outlet 56 so that the oil in both liquid and mist form leaves the lubricator. For a given setting of the guide member, additional air may be mixed with the jet discharged at the outlet 56 simply by adjusting the regulating valve or screw 55 whereby air from the air chamber flows through the bypass passage 55a adjacent the discharge outlet.

The sides of the semicircular side walls of the channel member may be so dimensioned that the entire oil jet is not directed through it whereby part of the oil in the jet may flow over the side of the channel and return to the oil bath in the oil reservoir. A spill way is thus formed which may be adapted to suit the concentration of oil in the mist as required.

If desired, the guide member or diverter 60 may be adjusted to various intermediate positions other than the two described above, the cutouts 79 being larger than the cross section of the rib 71 to permit turning thereof to intermediate positions. For example, the guide member may be formed in such a manner that it can be applied in an intermediate position whereby it will be possible to direct only a portion of the jet through the channel and direct a portion against the baffle 62 and thus obtain other concentrations of oil.

When it is desired to obtain a smaller concentration of oil in the mist than is normally obtainable with the nozzle, the apparatus is provided with an air nozzle through which extra air may be supplied to the jet. This nozzle is located in any suitable position in the path of the jet between the nozzle and the outlet. An oil mist of this kind may for instance be suitable for lubricating and cooling ultra precision spindles.

When the guide member is located in the position shown in FIG. 3, it is possible to modify it so that the notches 79 which serve to locate it when in the position for providing an oil mist of great oil concentration are closed by a thin wall. Should it be desired to use it in the position shown in FIG. 4 to give greater oil concentration, these thin walls may be easily removed with a suitable tool to provide a channel member with notches 79 fitting the rib 71 on the dividing wall. It is also possible to vary the amount of overflow through the notches by modifying their size in a desired direction.

While a particular embodiment of the present invention has been illustrated and described herein, it is not intended to limit the invention to such disclosure and changes and modifications may be made therein within the scope of the following claims.

I claim:
1. A lubricator comprising a container defining a reservoir for a lubricant, a chamber for a gaseous fluid above the lubricant reservoir including a dividing wall between the chamber and lubricant reservoir, an ejector nozzle in the dividing wall, means operatively connecting the ejector nozzle with the lubricant reservoir whereby a jet of lubricant mist is discharged from the ejector nozzle, a discharge outlet for the lubricant mist and a guide member interposed in the path of the jet of lubricant mist which is selectively adjustable to vary the concentration of lubricant in the lubricant mist delivered at the discharge outlet.

2. A lubricator as claimed in claim 1 wherein said guide member is adapted to be disposed in a first limit position whereby the jet of lubricant mist from the ejector nozzle is directed in an arcuate path in the space above the lubricant reservoir whereby lubricant which has not been atomized in the nozzle and which does not remain suspended in the air is returned to the lubricant reservoir and a fine mist is discharged at the outlet and a second position wherein the jet of lubricant mist flows directly from the ejector nozzle to the discharge outlet to provide for greater concentration of lubricant in the mist discharged at the discharge outlet.

3. A lubricator comprising a container defining a reservoir for a lubricant, a chamber for a gaseous fluid above the lubricant reservoir including a dividing wall between the chamber and lubricant reservoir, an ejector nozzle in the dividing wall, means operatively connecting the ejector nozzle with the lubricant reservoir whereby a jet of lubricant mist is discharged from the ejector nozzle, a discharge outlet for the lubricant mist and a guide member interposed in the path of the jet of lubricant mist which is selectively adjustable to vary the concentration of lubricant in the lubricant mist delivered at the discharge outlet, said guide member comprising a baffle and a channel member disposed transversely to the baffle, said guide member adapted to be disposed in a first limit position wherein the baffle confronts the ejector nozzle discharge and the jet of lubricant mist from the ejector nozzle is directed in an arcuate path in the space above the lubricant reservoir so that lubricant which has not been atomized in the nozzle and which does not remain suspended in the air is returned to the lubricant reservoir and a fine mist is discharged at the outlet and a second position wherein the channel member is aligned with the nozzle discharge and the jet of lubricant mist flows directly from the ejector nozzle to the discharge outlet to provide for greater concentration of lubricant in the mist discharged at the discharge outlet.

4. A lubricator as claimed in claim 3 wherein said channel member comprises a pair of spaced apart side walls including a pair of notches which engage over a rib depending from the dividing wall separating the ejector nozzle discharge end and the discharge outlet.

5. A lubricator as claimed in claim 3 including a passage directly connecting the air chamber and the discharge outlet and valve control means in said passage for selectively adding gaseous fluid to the lubricant mist at the discharge outlet.

6. A lubricator as claimed in claim 3 including a riser tube in the lubricant reservoir and a passageway connecting the upper end of the riser tube and the ejector nozzle and wherein said guide member is mounted for adjustable movement on said riser tube.

7. A lubricator as claimed in claim 6 including a needle valve in said passageway connecting the inner end of the riser tube and the discharge side of the nozzle for varying flow of lubricant through the nozzle discharge.

8. A lubricator as claimed in claim 3 including valve means for selectively controlling the pressure in the chamber.

References Cited

UNITED STATES PATENTS 3,064,760 11/1962 Shada.

FOREIGN PATENTS 32,372 5/1964 Germany.

HOUSTON S. BELL, Jr., *Primary Examiner.*

U.S. Cl. X.R.

55—237; 239—338; 261—76; 138—46; 222—396